Patented Dec. 11, 1928.

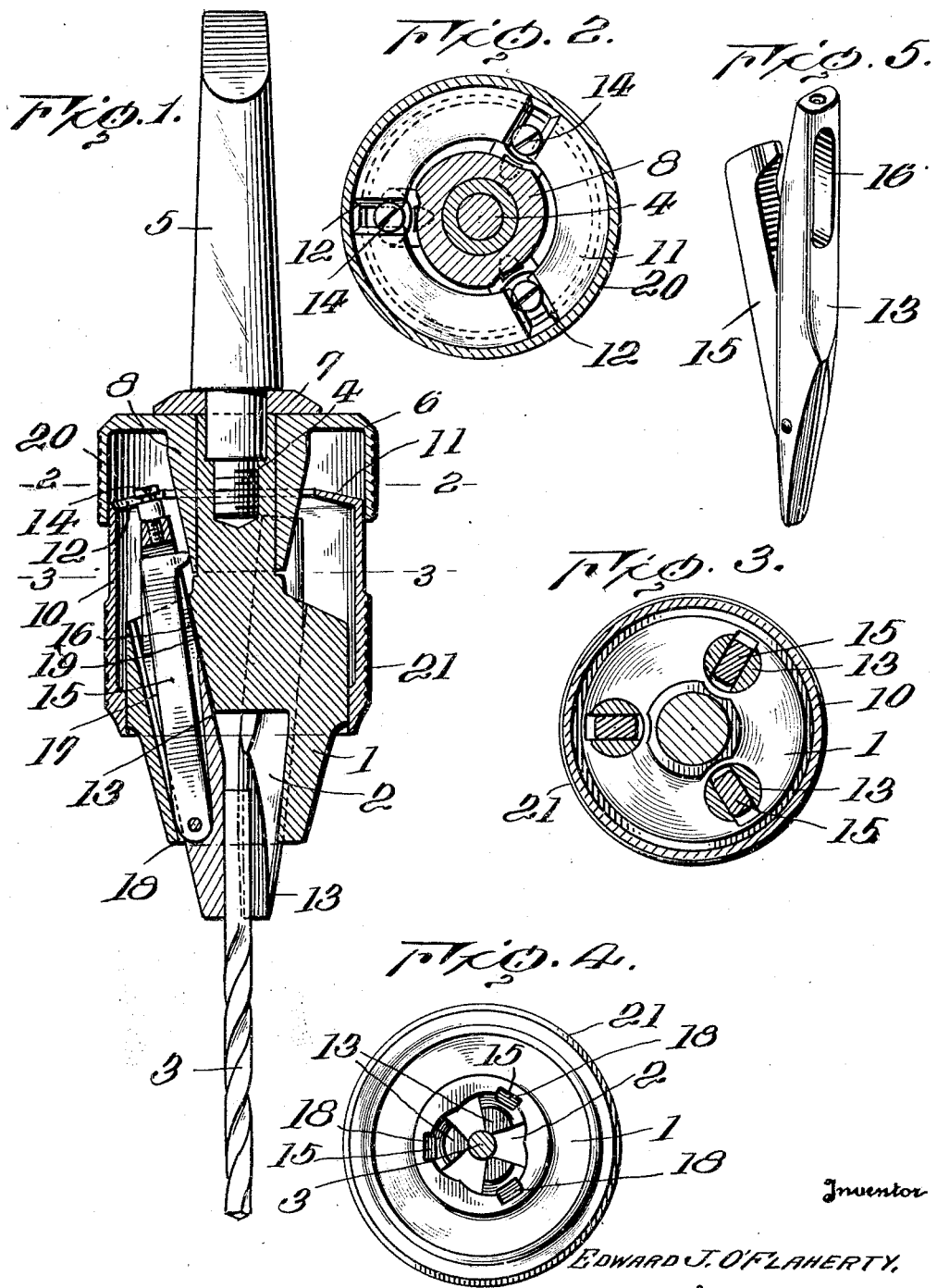

1,694,558

UNITED STATES PATENT OFFICE.

EDWARD J. O'FLAHERTY, OF LAKEWOOD, OHIO.

TOOL CHUCK.

Application filed September 18, 1926. Serial No. 136,254.

This invention relates to chucks or sockets for tools, such as drills, bits and the like, and the object of my invention is to provide such a chuck or socket which may be easily manipulated to clamp the tool and hold it firmly in position during use.

Another object of my invention is to provide a chuck or socket which will serve as a holder for drills or other tools of various sizes.

Still another object of my invention is to provide such a chuck or socket in which the cooperating parts have a plain engagement with each other thereby obviating the necessity for a screw threaded or a bayonet joint connection.

I accomplish the above and other objects of my invention, which will be apparent as the description proceeds, by means of the device shown in the accompanying drawings, in which Figure 1 is a vertical central section of my improved chuck or socket, the handle and tool being shown in full lines;

Figure 2 is a section on the line 2—2 of Fig. 1;

Figure 3 is a section on the line 3—3 of Fig. 1;

Figure 4 is a plan view of the lower end of the device, the drill being shown in section; and Figure 5 is a perspective of one of the clamping jaws.

On the drawings, in which like reference characters indicate like parts on all the figures thereof, 1 indicates the body member, a socket 2 being formed in its lower portions for the reception of a tool, such as the drill 3.

The upper portion of the body member 1 is provided with a screw threaded socket 4 into which the shank 5 is screwed. Over the upper portion of the body member 1 is fitted the cap 6 on which rests a washer 7 so that, when the shank 5 is screwed in place, the cap is held in position over the member 1.

The cap 6 is provided with a central boss 8 which is formed with a plurality of cam faces, preferably three in number, each of the faces being formed with a high point at one end for a purpose to be presently set forth.

Fitted within the cap 6 and surrounding the body member 1 is the jaw carrier 10 which has a sliding engagement with both the cap and the body member. The jaw carrier is in the form of a tubular shell provided with an inwardly extending flange forming a head 11. The flanged head slopes upwardly and is provided with a plurality of slotted guide ways 12 having bevelled side edges. The jaws 13 are provided with headed screws 14 which operate in the guide ways 12 whereby the upper ends of the jaws move on a slightly curved upward path when the chuck is manipulated to clamp the tool in place. If desired the screws 14 may be provided with rollers to facilitate their sliding action. The jaws 13 carry pivoted dogs 15 which extend through openings 16 in the jaws and cooperate with the cam faces 8 to lock the jaws in clamping position.

The body member 1 is provided with oblique sockets 17 in which the jaws operate, the dogs fitting into the grooves 18 in the sockets, the lower edge of each dog being curved so as to bind and be held firmly between the jaw and the grooved way in the body member.

The cam faces have a slope of about 15 degrees as have also the faces 19 of the sockets 17 in the body member.

The cap 6 is provided with a knurled hand hold 20, and the tubular shell 10 is likewise provided with a knurled handhold 21.

When it is desired to clamp a drill or bit in the chuck it is inserted in socket 2, the hand holds 20 and 21 are grasped and the tubular shell forced out relatively to the cap until the jaws grip the inserted tool, the jaws riding on the inclined face 19 and the dogs on the inclined faces of the respective cams, while the headed screws 14 move in the bevelled guide ways 12. When the jaws clamp around the inserted tool, the cap 6 and the shell 10 are given a relative rotation, the dogs thus being forced outwardly by the respective cam face, thereby locking the jaws in their clamping position. The high points on the cam faces limit the movement of the dogs and prevent them from riding off of their respective cam faces. When this locking position is reached, the lower edge of the dog will be clamped between the jaw and the groove in the body member and a powerful clamping action will be exerted against the jaw.

It will thus be seen that the clamping of the tool in the chuck is accomplished without the use of screw threads, such a screw threaded connection necessitating the use of a wrench or similar device in order to manipulate the chuck so that the inserted tool will be held securely. My improved chuck requires the application of a comparatively slight force in order to effect the movement of the parts, while the relative rotation of the dogs and the cam faces results in a much greater force for clamping the jaws against the tool than is common in devices of this type.

While I have described the preferred form of my device, it is to be understood that I do not desire to be limited thereby except by the scope of the appended claims.

What I claim and desire to secure by Letters Patent is:—

1. In a chuck, a body member, a boss on said body member, said boss having a tapered face provided with a plurality of tapering cam faces, said body member being provided with a plurality of tapered faces, the tapered faces of the boss and the body member being formed on the same angle, a plurality of jaws having sliding engagement in a longitudinal direction with the tapered faces of the body member and means on said jaws cooperating with the tapering cam faces for holding said jaws against sliding movement.

2. In a chuck, a body member, said body member provided with a plurality of tapered sockets, a conical boss in said body member, said boss being provided with a plurality of cam faces extending circumferentially around said boss, a jaw carrier cooperatively engaging said body member, jaws carried by said jaw carrier extending into the sockets in said body, locking dogs pivoted to said jaws and having one extremity of each dog engaging a cam face and the other extremity engaging a wall of a socket, said body member and said jaw carrier being relatively slidable in a longitudinal direction to move the jaws in the sockets to extend the same to clamping position and relatively rotatable to cause the dogs to ride the cam faces to hold the jaws in extended clamping position.

3. In a chuck, a body member, said body member provided with a plurality of tapered sockets and a plurality of cam faces, a jaw carrier cooperatively engaging said body member, jaws carried by said jaw carrier and movable in said sockets, locking dogs pivoted to said jaws, said body member and said jaw carrier being relatively slidable in a longitudinal direction to move the jaws in the sockets to extend the same to clamping position and relatively rotatable to cause the dogs to ride on the cam faces to hold the jaws in extended clamping position.

4. In a chuck, a body member, said body member provided with a plurality of tapered sockets, a conical boss in said body member, said boss being provided with a plurality of cam faces extending circumferentially around said boss, a jaw carrier cooperatively engaging said body member, jaws carried by said jaw carrier extending into the sockets in said body member, locking dogs carried by said jaws, each movable in one of said sockets and engaging a cam face, said body member and said jaw carrier being relatively movable in a longitudinal direction to move the jaws in the sockets to extend the same to clamping position and relatively rotatable to cause the dogs to ride on the cam faces to hold the jaws in extended clamping position.

5. In a chuck, a body member, a longitudinally movable jaw carrier, clamping jaws on said carrier, said body member being provided with cam faces, said body member and said jaw carrier being relatively movable in a longitudinal direction to extend the jaws, means on said body independent of said cam faces to move the jaws to clamping position when extended and means carried by the jaws riding on said cam faces to provide a friction lock for holding the jaws against longitudinal movement when extended.

6. In a chuck, a hollow body member, said body member being provided with cam faces on the interior thereof, a jaw carrier mounted to slide in said body member, clamping jaws on said carrier and movable therewith, means carried by said jaws and having a movement independent thereof, said body member and said jaw carrier being relatively movable in a longitudinal direction to extend the jaws to clamping position and relatively rotatable to cause said means to ride on the cam faces to hold the jaws in clamping position.

7. In a chuck, a body member, said body member being provided with cam faces, a jaw carrier, clamping jaws mounted on said jaw carrier and movable therewith, said body member and said jaw carrier being relatively movable in longitudinal direction to extend the jaws, means on said body member cooperating with said jaws to move said jaws to clamping position when extended, means carried by said jaws and independently movable thereof, said means rotatably engaging with said cam faces to hold the jaws against longitudinal movement when in their extended position.

In testimony whereof I affix my signature.

EDWARD J. O'FLAHERTY.